US007429318B2

United States Patent
Cody et al.

(10) Patent No.: US 7,429,318 B2
(45) Date of Patent: Sep. 30, 2008

(54) PROCESS FOR PREPARING BASESTOCKS HAVING HIGH VI USING OXYGENATED DEWAXING CATALYST

(75) Inventors: Ian A. Cody, Baton Rouge, LA (US); William J. Murphy, Baton Rouge, LA (US); Sylvain Hantzer, Prairieville, LA (US); David W. Larkin, Baton Rouge, LA (US); John E. Gallagher, Jr., Fairfax Station, VA (US); Jeenok T. Kim, Fairfax, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 19 days.

(21) Appl. No.: 11/438,059

(22) Filed: May 18, 2006

(65) Prior Publication Data
US 2007/0068850 A1   Mar. 29, 2007

Related U.S. Application Data

(62) Division of application No. 10/678,680, filed on Oct. 3, 2003, now Pat. No. 7,077,947.

(60) Provisional application No. 60/416,870, filed on Oct. 8, 2002.

(51) Int. Cl.
*C10G 71/00* (2006.01)
*C10G 47/02* (2006.01)

(52) U.S. Cl. .............................. 208/18; 208/19; 208/27; 208/89; 208/108

(58) Field of Classification Search .................... 208/18, 208/19, 27, 89, 108
See application file for complete search history.

(56) References Cited

U.S. PATENT DOCUMENTS

| 2,250,410 A | | 7/1941 | Van Peski |
| 3,523,072 A | * | 8/1970 | Schneider .................... 208/27 |
| 3,711,399 A | | 1/1973 | Estes |
| 4,097,364 A | | 6/1978 | Egan |
| 4,181,597 A | | 1/1980 | Yan et al. |

(Continued)

FOREIGN PATENT DOCUMENTS

EP    0140468    5/1985

(Continued)

OTHER PUBLICATIONS

J.S. Beck et al.: "A New Family of Mesoporous Molecular Sieves Prepared With Liquid Crystal Templates", J. Amer. Chem. Soc., 1992, vol. 114, p. 10834-843.

(Continued)

*Primary Examiner*—Glenn Caldarola
*Assistant Examiner*—John C Douglas
(74) *Attorney, Agent, or Firm*—Gerard J. Hughes; Lawrence E. Carter

(57) ABSTRACT

A process for preparing high VI lubricating oil basestocks comprising hydrotreating, hydrodewaxing and optionally hydrofinishing. The hydrotreated feedstock is hydrodewaxed using a dewaxing catalyst that has been selectively activated by oxygenate treatment. The hydrodewaxed product may then be hydrofinished.

3 Claims, 2 Drawing Sheets

U.S. PATENT DOCUMENTS

| | | |
|---|---|---|
| 4,335,019 A | 6/1982 | Bowes et al. |
| 4,377,469 A | 3/1983 | Shihabi |
| 4,388,177 A | 6/1983 | Bowes et al. |
| 4,397,827 A | 8/1983 | Chu |
| 4,402,866 A | 9/1983 | Shihabi |
| 4,431,516 A | 2/1984 | Baird et al. |
| 4,431,517 A | 2/1984 | Nevitt et al. |
| 4,431,519 A | 2/1984 | LaPierre et al. |
| 4,431,527 A | 2/1984 | Miller et al. |
| 4,436,614 A | 3/1984 | Olbrich et al. |
| 4,440,871 A | 4/1984 | Lok et al. |
| 4,460,698 A | 7/1984 | Hensley, Jr. et al. |
| 4,483,764 A | 11/1984 | Hensley, Jr. et al. |
| 4,490,242 A | 12/1984 | Oleck et al. |
| 4,510,045 A | 4/1985 | Dessau |
| 4,523,047 A | 6/1985 | Chester et al. |
| 4,568,449 A | 2/1986 | Angmorter et al. |
| 4,585,747 A | 4/1986 | Valyocsik |
| 4,594,146 A | 6/1986 | Chester et al. |
| 4,599,162 A | 7/1986 | Yen |
| 4,601,993 A | 7/1986 | Chu et al. |
| 4,610,778 A | 9/1986 | Graven |
| 4,622,130 A | 11/1986 | Stem |
| 4,636,299 A | 1/1987 | Unmuth et al. |
| 4,672,049 A | 6/1987 | Chen et al. |
| 4,684,756 A | 8/1987 | Derr, Jr. et al. |
| 4,784,747 A | 11/1988 | Shihabi |
| 4,810,357 A | 3/1989 | Chester et al. |
| 4,900,707 A | 2/1990 | Cody et al. |
| 4,911,821 A | 3/1990 | Katzer et al. |
| 4,919,788 A | 4/1990 | Chen et al. |
| 4,943,672 A | 7/1990 | Hamner et al. |
| 4,975,177 A | 12/1990 | Garwood et al. |
| 5,017,535 A | 5/1991 | Schoonhoven et al. |
| 5,037,528 A | 8/1991 | Garwood et al. |
| 5,059,299 A | 10/1991 | Cody et al. |
| 5,075,269 A | 12/1991 | Degnan et al. |
| 5,082,988 A | 1/1992 | Holtermann |
| 5,098,684 A | 3/1992 | Kresge et al. |
| 5,146,022 A | 9/1992 | Buchanan et al. |
| 5,198,203 A | 3/1993 | Kresge et al. |
| 5,208,403 A | 5/1993 | Buchanan et al. |
| 5,227,353 A | 7/1993 | Apelian et al. |
| 5,232,579 A | 8/1993 | Absil et al. |
| 5,246,566 A | 9/1993 | Miller |
| 5,264,641 A | 11/1993 | Borghard et al. |
| 5,275,719 A | 1/1994 | Baker, Jr. et al. |
| 5,276,229 A | 1/1994 | Buchanan et al. |
| 5,282,958 A | 2/1994 | Santilli et al. |
| 5,288,395 A | 2/1994 | Marler et al. |
| 5,292,983 A | 3/1994 | Sie |
| 5,358,628 A | 10/1994 | Apelian et al. |
| 5,447,623 A | 9/1995 | Ward |
| 5,498,821 A | 3/1996 | Ryan et al. |
| 5,516,736 A | 5/1996 | Chang et al. |
| 5,573,657 A | 11/1996 | Degnan et al. |
| 5,643,440 A | 7/1997 | Borghard et al. |
| 5,689,031 A | 11/1997 | Berlowitz et al. |
| 5,730,858 A | 3/1998 | Olivier et al. |
| 5,837,639 A | 11/1998 | Kresge et al. |
| 5,911,874 A | 6/1999 | Cody et al. |
| 5,935,417 A | 8/1999 | Cody et al. |
| 5,951,848 A | 9/1999 | Baker, Jr. et al. |
| 5,993,644 A | 11/1999 | Xiao et al. |
| 6,013,171 A | 1/2000 | Cook et al. |
| 6,051,129 A | 4/2000 | Harris et al. |
| 6,068,757 A | 5/2000 | Walker, III |
| 6,080,301 A | 6/2000 | Berlowitz et al. |
| 6,090,989 A | 7/2000 | Trewella et al. |
| 6,096,189 A | 8/2000 | Cody et al. |
| 6,099,719 A | 8/2000 | Cody et al. |
| 6,103,101 A | 8/2000 | Fragelli et al. |
| 6,136,181 A | 10/2000 | Ziemer |
| 6,179,994 B1 | 1/2001 | Clark et al. |
| 6,190,532 B1 | 2/2001 | Degnan et al. |
| 6,231,749 B1 | 5/2001 | Degnan et al. |
| 6,264,826 B1 | 7/2001 | Xiao et al. |
| 6,294,077 B1 | 9/2001 | Dougherty et al. |
| 6,303,534 B1 | 10/2001 | Strohmaier et al. |
| 6,310,265 B1 | 10/2001 | Chester et al. |
| 6,322,692 B1 | 11/2001 | Cody et al. |
| 6,337,010 B1 | 1/2002 | Hofer |
| 6,383,366 B1 | 5/2002 | Riley et al. |
| 6,399,845 B1 | 6/2002 | Raulo et al. |
| 6,420,618 B1 | 7/2002 | Berlowitz et al. |
| 6,663,768 B1 | 12/2003 | Miller |
| 2001/0004972 A1 | 6/2001 | Miller et al. |
| 2001/0006154 A1 | 7/2001 | Krug et al. |
| 2002/0003102 A1 | 1/2002 | O'Rear et al. |
| 2003/0168379 A1 | 9/2002 | Degnan et al. |

FOREIGN PATENT DOCUMENTS

| | | |
|---|---|---|
| EP | 0147873 | 3/1988 |
| EP | 0635557 | 1/1995 |
| EP | 0707057 | 4/1996 |
| EP | 0776959 | 6/1997 |
| EP | 0909304 | 9/2001 |
| FR | 2805543 | 2/2000 |
| FR | 2805542 | 8/2001 |
| GB | 772478 | 4/1957 |
| GB | 1582789 | 1/1981 |
| GB | 2109402 | 6/1983 |
| GB | 2311789 | 10/1997 |
| SU | 1696391 | 12/1991 |
| WO | WO 96/03359 | 2/1996 |
| WO | WO 97/18278 | 5/1997 |
| WO | WO 98/02502 | 1/1998 |
| WO | WO 98/18883 | 5/1998 |
| WO | WO 99/20720 | 4/1999 |
| WO | WO 99/41336 | 8/1999 |
| WO | WO 00/78677 | 12/2000 |
| WO | WO 01/07538 | 2/2001 |
| WO | WO 01/18156 | 3/2001 |
| WO | WO 01/64339 | 9/2001 |
| WO | WO 02/42207 | 5/2002 |
| WO | WO 02/48283 | 6/2002 |
| WO | WO 02/48291 | 6/2002 |
| WO | WO 02/88279 | 11/2002 |
| WO | WO 02/99014 | 12/2002 |

OTHER PUBLICATIONS

N.Y. Chen et al.: "TMA-Offretite. Relationship Between Structural and Catalytic Properties", J. Catalysis, 1984, vol. 86, p. 24-31.

* cited by examiner

PROCESS FOR PREPARING BASESTOCKS HAVING HIGH VI USING OXYGENATED DEWAXING CATALYST

CROSS REFERENCE TO RELATED APPLICATIONS

This application is a Divisional Application of U.S. patent application Ser. No. 10/678,680 filed Oct. 3, 2003, now U.S. Pat. No. 7,077,947, which claims benefit of U.S. Provisional Patent Application Ser. No. 60/416,870 filed Oct. 8, 2002.

FIELD OF THE INVENTION

This invention relates to a process for preparing lubricating oil basestocks having a high viscosity index (VI) from wax containing feeds. More particularly, a wax containing feedstock is hydrotreated under mild conditions, catalytically hydrodewaxed using a dewaxing catalyst which has been selectively activated by treatment with an oxygenate, and hydrofinished.

BACKGROUND OF THE INVENTION

Historically, lubricating oil products for use in applications such as automotive engine oils have used additives to improve specific properties of the basestocks used to prepare the finished products. With the advent of increased environmental concerns, the performance requirements for the basestocks themselves have increased. American Petroleum Institute (API) requirements for Group II basestocks include a saturates content of at least 90%, a sulfur content of 0.03 wt. % or less and a viscosity index (VI) between 80 and 120. The requirements for Group III basestocks are those of Group II basestocks except that the VI is at least 120.

Conventional techniques for preparing basestocks such as hydrocracking or solvent extraction require severe operating conditions such as high pressure and temperature or high solvent:oil ratios and high extraction temperatures to reach these higher basestock qualities. Either alternative involves expensive operating conditions and low yields.

Hydrocracking has been combined with hydrotreating as a preliminary step. However, this combination also results in decreased yields of lubricating oils due to the conversion to distillates that typically accompany the hydrocracking process.

It would be desirable to have a economical process for preparing Group III basestocks in high yields by minimizing conversion to low boiling distillates while at the same time producing a product having excellent low temperature properties, high VI and high stability.

SUMMARY OF THE INVENTION

The present invention is directed to a process for preparing a lubricating oil basestock having a VI of at least about 125 which comprises:

(a) hydrotreating a lubricating oil feedstock having a wax content of at least about 50 wt. %, based on feedstock, with a hydrotreating catalyst under effective hydrotreating conditions;

(b) stripping the hydrotreated feedstock to separate gaseous from liquid product;

(c) contacting a dewaxing catalyst with a stream containing at least about 100 wppm, measured as oxygen, of at least one oxygenate at a temperature of from 120 to 400° C. and a hydrogen pressure of from 791 to 20786 kPa to produce a selectivated dewaxing catalyst; and (d) contacting the selectivated dewaxing catalyst from step (c) with the liquid product from step (b) and dewaxing the liquid product under catalytically effective dewaxing conditions.

Another embodiment relates to a process for preparing a lubricating oil basestock having a VI of at least about 125 which comprises:

(a) hydrotreating a lubricating oil feedstock having a wax content of at least about 50 wt. %, based on feedstock, with a hydrotreating catalyst under effective hydrotreating conditions;

(b) stripping the hydrotreated feedstock to separate gaseous from liquid product;

(c) contacting a dewaxing catalyst which contains at least one molecular sieve containing at least one 10 or 12 ring channel with a stream containing at least about 100 wppm, measured as oxygen, of at least one alcohol, carboxylic acid, ester, aldehyde, ketone or ether at a temperature of from 120 to 400° C. and a hydrogen pressure of from 101 to 20786 kPa to produce a selectivated dewaxing catalyst; and (d) contacting the selectivated dewaxing catalyst from step (c) with the liquid product from step (b) and dewaxing the liquid product under catalytically effective dewaxing conditions.

Yet another embodiment relates to a process for preparing a lubricating oil basestock having a VI of at least about 125 which comprises:

(a) hydrotreating a lubricating oil feedstock having a wax content of at least about 50 wt. %, based on feedstock, with a hydrotreating catalyst under effective hydrotreating conditions;

(b) stripping the hydrotreated feedstock to separate gaseous from liquid product;

(c) contacting a dewaxing catalyst which contains at least one molecular sieve containing at least one 10 or 12 ring channel with a stream containing at least about 100 wppm, measured as oxygen, of at least one alcohol, carboxylic acid, ester, aldehyde, ketone or ether at a temperature of from 120 to 400° C. and a hydrogen pressure of from 101 to 20786 kPa to produce a selectivated dewaxing catalyst;

(d) contacting the selectivated dewaxing catalyst from step (c) with the liquid product from step (b) and dewaxing the liquid product under catalytically effective dewaxing conditions; and.

(e) hydrofinishing the dewaxed product from step (d) with a hydrofinishing catalyst under effective hydrofinishing conditions.

A still further embodiment relates to a process for preparing a lubricating oil basestock having a VI of at least about 125 which comprises:

(a) hydrotreating a lubricating oil feedstock having a wax content of at least about 50 wt. %, based on feedstock, with a hydrotreating catalyst under effective hydrotreating conditions;

(b) stripping the hydrotreated feedstock to separate gaseous from liquid product;

(c) contacting a dewaxing catalyst which contains ZSM-48 and a metal hydrogenation component which contains at least one of Pt or Pd with a stream containing at least about 100 wppm, measured as oxygen, of at least one alcohol, carboxylic acid, ester, aldehyde, ketone or ether at a temperature of from 120 to 400° C. and a hydrogen pressure of from 101 to 20786 kPa to produce a selectivated dewaxing catalyst;

(d) contacting the selectivated dewaxing catalyst from step (c) with the liquid product from step (b) and dewaxing the liquid product under catalytically effective dewaxing conditions; and.

(e) hydrofinishing the dewaxed product from step (d) with a mesoporous hydrofinishing catalyst from the M41S family under effective hydrofinishing conditions.

A further embodiment relates to a process for preparing a lubricating oil basestock having a VI of at least about 125 which comprises:

(a) hydrotreating a lubricating oil feedstock having a wax content of at least about 50 wt. %, based on feedstock, with a hydrotreating catalyst under effective hydrotreating conditions;

(b) stripping the hydrotreated feedstock to separate gaseous from liquid product;

(c) adding at least one oxygenate to the liquid product from step (b) to provide a second liquid product containing at least about 100 wppm oxygen, (d) contacting the second liquid product from step (c) with a dewaxing catalyst at a temperature of from 120 to 400° C. and a hydrogen pressure of from 791 to 20786 kPa for a time effective to selectivate the dewaxing catalyst; and (e) contacting the selectivated dewaxing catalyst from step (d) with at least one of the second liquid product from step (c) or the liquid product from step (b) under catalytically effective dewaxing conditions.

Another embodiment relates to a process for preparing a lubricating oil basestock having a VI of at least about 125 which comprises:

(a) hydrotreating a lubricating oil feedstock having a wax content of at least about 50 wt. %, based on feedstock, with a hydrotreating catalyst under effective hydrotreating conditions;

(b) stripping the hydrotreated feedstock to separate gaseous from liquid product;

(c) adding at least one alcohol, carboxylic acid, ester, aldehyde, ketone or ether to the liquid product from step (b) to provide a second liquid product containing at least about 100 wppm oxygen;

(d) contacting the second liquid product from step (c) with a dewaxing catalyst which contains at least one molecular sieve containing at least one 10 or 12 ring channel at a temperature of from 120 to 400° C. and a hydrogen pressure of from 791 to 20786 kPa for a time effective to selectivate the dewaxing catalyst; and (e) contacting the selectivated dewaxing catalyst from step (d) with at least one of the second liquid product from step (c) or the liquid product from step (b) under catalytically effective dewaxing conditions.

Yet another embodiment relates to a process for preparing a lubricating oil basestock having a VI of at least about 125 which comprises:

(a) hydrotreating a lubricating oil feedstock having a wax content of at least about 50 wt. %, based on feedstock, with a hydrotreating catalyst under effective hydrotreating conditions;

(b) stripping the hydrotreated feedstock to separate gaseous from liquid product;

(c) adding at least one alcohol, carboxylic acid, ester, aldehyde, ketone or ether to the liquid product from step (b) to provide a second liquid product containing at least about 100 wppm oxygen;

(d) contacting the second liquid product from step (c) with a dewaxing catalyst which contains at least one molecular sieve containing at least one 10 or 12 ring channel at a temperature of from 120 to 400° C. and a hydrogen pressure of from 791 to 20786 kPa for a time effective to selectivate the dewaxing catalyst;

(e) contacting the selectivated dewaxing catalyst from step (d) with at least one of the second liquid product from step (c) or the liquid product from step (b) under catalytically effective dewaxing conditions; and (f) hydrofinishing the dewaxed product from step (e) with a hydrofinishing catalyst under effective hydrofinishing conditions.

A still further embodiment relates to a process for preparing a lubricating oil basestock having a VI of at least about 125 which comprises:

(a) hydrotreating a lubricating oil feedstock having a wax content of at least about 50 wt. %, based on feedstock, with a hydrotreating catalyst under effective hydrotreating conditions;

(b) stripping the hydrotreated feedstock to separate gaseous from liquid product;

(c) adding at least one alcohol, carboxylic acid, ester, aldehyde, ketone or ether to the liquid product from step (b) to provide a second liquid product containing at least about 100 wppm oxygen;

(d) contacting the second liquid product from step (c) with a dewaxing catalyst which contains ZSM-48 and a metal hydrogenation component which contains at least one of Pt or Pd at a temperature of from 120 to 400° C. and a hydrogen pressure of from 791 to 20786 kPa for a time effective to selectivate the dewaxing catalyst;

(e) contacting the selectivated dewaxing catalyst from step (d) with at least one of the second liquid product from step (c) or the liquid product from step (b) under catalytically effective dewaxing conditions; and (f) hydrofinishing the dewaxed product from step (e) with a hydrofinishing catalyst from the M41 S family under effective hydrofinishing conditions.

The basestocks according to the invention meet the requirements of a Group III basestock and can be prepared in high yields while at the same time possessing excellent properties such as high VI and low pour point. Selective oxygenate activation of the dewaxing catalyst further improves both yield and VI.

DETAILED DESCRIPTION OF THE INVENTION

Feedstocks

Figure 1:
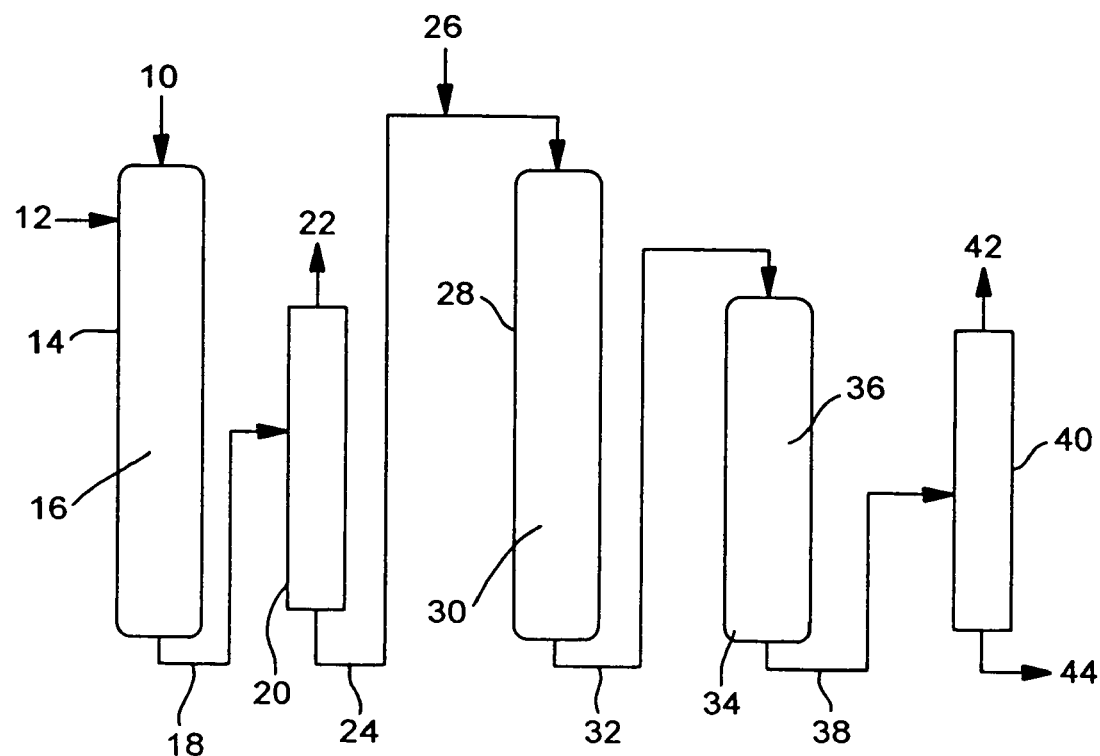
FIG. 1 is a schematic flow diagram of the process.

The feedstock used in the process of the invention are wax-containing feeds that boil in the lubricating oil range, typically having a 10% distillation point greater than 650° F. (343° C.), measured by ASTM D 86 or ASTM 2887, and are derived from mineral or synthetic sources. The wax content of the feedstock is at least about 50 wt. %, based on feedstock and can range up to 100 wt. % wax. The wax content of a feed may be determined by nuclear magnetic resonance spectroscopy (ASTM D5292), by correlative ndM methods (ASTM D3238) or by solvent methods (ASTM D3235). The waxy feeds may be derived from a number of sources such as oils derived from solvent refining processes such as raffinates, partially solvent dewaxed oils, deasphalted oils, distillates, vacuum gas oils, coker gas oils, slack waxes, foots oils and the like, and Fischer-Tropsch waxes. Preferred feeds are slack waxes and Fischer-Tropsch waxes. Slack waxes are typically derived from hydrocarbon feeds by solvent or propane dewaxing. Slack waxes contain some residual oil and are typically deoiled. Foots oils are derived from deoiled slack waxes. Fischer-Tropsch waxes are prepared by the Fischer-Tropsch synthetic process.

Feedstocks may have high contents of nitrogen- and sulfur-contaminants. Feeds containing up to 0.2 wt. % of nitrogen, based on feed and up to 3.0 wt. % of sulfur can be processed in the present process. Feeds having a high wax content typically have high viscosity indexes of up to 200 or more. Sulfur and nitrogen contents may be measured by standard ASTM methods D5453 and D4629, respectively.

For feeds derived from solvent extraction, the high boiling petroleum fractions from atmospheric distillation are sent to a vacuum distillation unit, and the distillation fractions from this unit are solvent extracted. The residue from vacuum distillation may be deasphalted. The solvent extraction process selectively dissolves the aromatic components in an extract phase while leaving the more paraffinic components in a raffinate phase. Naphthenes are distributed between the extract and raffinate phases. Typical solvents for solvent extraction include phenol, furfural and N-methyl pyrrolidone. By controlling the solvent to oil ratio, extraction temperature and method of contacting distillate to be extracted with solvent, one can control the degree of separation between the extract and raffinate phases.

Hydrotreating

For hydrotreating, the catalysts are those effective for hydrotreating such as catalysts containing Group 6 metals (based on the IUPAC Periodic Table format having Groups from 1 to 18), Groups 8-10 metals, and mixtures thereof. Preferred metals include nickel, tungsten, molybdenum, cobalt and mixtures thereof. These metals or mixtures of metals are typically present as oxides or sulfides on refractory metal oxide supports. The mixture of metals may also be present as bulk metal catalysts wherein the amount of metal is 30 wt. % or greater, based on catalyst. Suitable metal oxide supports include oxides such as silica, alumina, silica-aluminas or titania, preferably alumina. Preferred aluminas are porous aluminas such as gamma or eta. The amount of metals, either individually or in mixtures, ranges from about 0.5 to 35 wt. %, based on the catalyst. In the case of preferred mixtures of groups 9-10 metals with group 6 metals, the groups 9-10 metals are present in amounts of from 0.5 to 5 wt. %, based on catalyst and the group 6 metals are present in amounts of from 5 to 30 wt. %. The amounts of metals may be measured by atomic absorption spectroscopy, inductively coupled plasma-atomic emission spectrometry or other methods specified by ASTM for individual metals.

The acidity of metal oxide supports can be controlled by adding promoters and/or dopants, or by controlling the nature of the metal oxide support, e.g., by controlling the amount of silica incorporated into a silica-alumina support. Examples of promoters and/or dopants include halogen, especially fluorine, phosphorus, boron, yttria, rare-earth oxides and magnesia. Promoters such as halogens generally increase the acidity of metal oxide supports while mildly basic dopants such as yttria or magnesia tend to decrease the acidity of such supports.

Hydrotreating conditions include temperatures of from 150 to 400° C., preferably 200 to 350° C., a hydrogen partial pressure of from 1480 to 20786 kPa (200 to 3000 psig), preferably 2859 to 13891 kPa (400 to 2000 psig), a space velocity of from 0.1 to 10 LHSV, preferably 0.1 to 5 LHSV, and a hydrogen to feed ratio of from 89 to 1780 $m^3/m^3$ (500 to 10000 scf/B), preferably 178 to 890 $m^3/m^3$.

Hydrotreating reduces the amount of nitrogen- and sulfur-containing contaminants to levels which will not unacceptably affect the dewaxing catalyst in the subsequent dewaxing step. Also, there may be certain polynuclear aromatic species which will pass through the present mild hydrotreating step. These contaminants, if present, will be removed in a subsequent hydrofinishing step.

During hydrotreating, less than 5 wt. % of the feedstock, preferably less than 3 wt. %, more preferably less than 2 wt. %, is converted to 650° F. (343° C.) minus products to produce a hydrotreated feedstock whose VI increase is less than 4, preferably less than 3, more preferably less than 2 greater than the VI of the feedstock. The high wax contents of the present feeds results in minimal VI increase during the hydrotreating step.

The hydrotreated feedstock may be passed directly to the dewaxing step or preferably, stripped to remove gaseous contaminants such as hydrogen sulfide and ammonia prior to dewaxing. Stripping can be by conventional means such as flash drums or fractionators.

Dewaxing Catalyst and Oxygenate Treatment

The present process for the catalytic dewaxing of waxy feeds utilizes a catalyst that has been activated by contacting the catalyst with an oxygenate. A preferred dewaxing catalyst is one whose mode of dewaxing is by isomerizing wax molecules to isomerates with boiling points in the lube range.

The dewaxing catalyst may be either crystalline or amorphous. Crystalline materials are molecular sieves that contain at least one 10 or 12 ring channel and may be based on aluminosilicates (zeolites), or may be based on aluminophosphates. Zeolites used for oxygenate treatment may contain at least one 10 or 12 channel. Examples of such zeolites include ZSM-5, ZSM-11, ZSM-22, ZSM-23, ZSM-35, ZSM-48, ZSM-57, ferrierite, EU-1, NU-87, ITQ-13 and MCM-71. Examples of aluminophosphates containing at least one 10 ring channel include SAPO-11 and SAPO-41. Examples of molecular sieves containing 12 ring channels include zeolite beta, ZSM-12, MCM-68 SAPO-5, SAPO-31, MAPO-36, ZSM-18, mordenite, faujasite and offretite. It should be noted that a dewaxing catalyst such as ZSM-5 can have altered dewaxing properties by adjusting catalyst properties, such as acidity, metal dispersion and catalyst particle size as noted in U.S. Pat. No. 6,294,077. The molecular sieves are described in U.S. Pat. Nos. 5,246,566, 5,282,958, 4,975,177, 4,397,827, 4,585,747, 5,075,269 and 4,440,871. MCM-68 is described in U.S. Pat. No. 6,310,265. MCM-71 and ITQ-13 are described in PCT published applications WO 0242207 and WO 0078677. Preferred catalysts include ZSM-48, ZSM-22 and ZSM-23. Especially preferred is ZSM-48. As used herein, ZSM-48 includes EU-2, EU-11 and ZBM-30 which are structurally equivalent to ZSM-48. The molecular sieves are preferably in the hydrogen form. Reduction can occur in situ during the dewaxing step itself or can occur ex situ in another vessel.

Amorphous dewaxing catalysts include alumina, fluorided alumina, silica-alumina, fluorided silica-alumina and silica-alumina doped with Group 3 metals. Such catalysts are described for example in U.S. Pat. Nos. 4,900,707 and 6,383,366.

The dewaxing catalysts are bifunctional, i.e., they are loaded with a metal hydrogenation component, which is at least one Group 6 metal, at least one Group 8-10 metal, or mixtures thereof. Preferred metals are Groups 9-10 metals. Especially preferred are Groups 9-10 noble metals such as Pt, Pd or mixtures thereof (based on the IUPAC Periodic Table format having Groups from 1 to 18). These metals are loaded at the rate of 0.1 to 30 wt. %, based on catalyst. Catalyst preparation and metal loading methods are described for example in U.S. Pat. No. 6,294,077, and include for example ion exchange and impregnation using decomposable metal salts. Metal dispersion techniques and catalyst particle size control are described in U.S. Pat. No. 5,282,958. Catalysts with small particle size and well dispersed metal are preferred.

The molecular sieves are typically composited with binder materials that are resistant to high temperatures and may be employed under dewaxing conditions to form a finished dewaxing catalyst or may be binderless (self-bound). The binder materials are usually inorganic oxides such as silica, alumina, silica-aluminas, binary combinations of silicas with other metal oxides such as titania, magnesia, thoria, zirconia and the like and tertiary combinations of these oxides such as silica-alumina-thoria and silica-alumina magnesia. The amount of molecular sieve in the finished dewaxing catalyst is from 10 to 100, preferably 35 to 100 wt. %, based on catalyst. Such catalysts are formed by methods such spray drying, extrusion and the like. The dewaxing catalyst may be used in the sulfided or unsulfided form, and is preferably in the sulfided form.

Dewaxing conditions include temperatures of from 250-400° C., preferably 275 to 350° C., pressures of from 791 to 20786 kPa (100 to 3000 psig), preferably 1480 to 17339 kPa (200 to 2500 psig), liquid hourly space velocities of from 0.1 to 10 hr$^{-1}$, preferably 0.1 to 5 hr$^{-1}$ and hydrogen treat gas rates from 45 to 1780 m$^3$/m$^3$ (250 to 10000 scf/B), preferably 89 to 890 m$^3$/m$^3$ (500 to 5000 scf/B).

Oxygenates used to selectively activate the dewaxing catalyst are organic, oxygen-containing compounds (organo-oxygenates) which form water under hydrodewaxing conditions. Oxygenates include carboxylic acids, alcohols including polyols, esters, aldehydes, ethers, ketones and mixtures thereof, or an inorganic oxygenate which is water. Preferred oxygenates are alcohols, esters, ethers and carboxylic acids, especially alcohols. The organo moieties contain at least 1 carbon atom and may range up to oxygen contained in oxidized hydrocarbon feeds in the lube boiling range (343° C.+ as measured by ASTM D 86 or ASTM 2887).

The feed used to selectively activate the catalyst contains at least about 100 wppm, measured as oxygen, of at least one oxygenate, preferably at least about 400 wppm, measured as oxygen, of at least one oxygenate. Amounts of oxygenates greater than 10000 wppm may be used if desired as such amounts will not adversely affect the dewaxing process or products. The total oxygen content of an oxygenate can be measured by instrumental methods such as neutron activation analysis which may be combined with high resolution proton nuclear magnetic resonance, gas chromatography with oxygen flame ionization detector, gas chromatography-mass spectrometry (GC-MS) or fourier transform infrared spectroscopy. Neutron activation analysis is preferred for low concentrations of oxygenates. Oxygenate contents of feeds (as oxygenate) may be determined by proton nuclear magnetic resonance or by GC-MS.

Various methods have been proposed for measuring the selectivity of dewaxing catalysts. In one method described in J. Catalysis, 1984, 86, 24-31, a feedstock is catalytically dewaxed over the zeolite whose selectivity is determined at various reaction severities to achieve different product pour points. The conversion required to achieve a given degree of dewaxing may then be compared with a reference catalyst such as ZSM-5 to determine relative selectivity. In U.S. Pat. No. 5,282,958, selectivity is measured for a given molecular sieve having a defined crystallite size and pore diameter by measuring the isomerization of n-hexadecane under a given set of test conditions.

In the present invention, selectivity for a given catalyst is defined as the fractional amount of lube boiling range isomerate formed at the target pour point from the wax component of the feed. The improvement in selectivity as a result of oxygenate treatment for a given dewaxing catalyst is to isomerize at least 4 relative % more of the wax component into lube boiling range isomerate at the pour point target, preferably at least 6 relative %, more preferably at least 10 relative %.

The selectivity improvement for any give dewaxing catalyst may be calculated as illustrated in the hypothetical example given in the following chart showing isomerate yield improvement at equivalent pour point for dewaxing a waxy feed. Catalyst A and Catalyst B (which is Catalyst A treated with oxygenate). The yield for the example is obtained by adjusting if necessary dewaxing conditions of temperature and space velocity to achieve equivalent pour point.

|  | Catalyst A (untreated) | Catalyst B (oxygenate treated) |
|---|---|---|
| Wax content of feed | 90.0% | 90.0% |
| Yield of isomerate at target pour | 61.0 wt. % | 72.0 wt. % |
| Isomerate selectivity | 0.567* | 0.689* |
| Selectivity improvement |  | 1.215** |
| Relative selectivity improvement % |  | 21.5%*** |

*Calculation: [61.0 − (100 − 90)]/90 = 0.567 [72.0 − (100 − 90)]/90 = 0.689
**0.689/0.567 = 1.215; no improvement is 0.567/0.567 = 1.0
***(1.215 − 1.000) × 100 = 21.5%

For any given catalyst, isomerate yield should improve with increasing wax content of the feed. Thus feeds with higher wax contents, e.g., greater than 40 wt. %, based on feed, are preferred.

Hydrofinishing

At least a portion of the product from dewaxing is passed directly to a hydrofinishing step without disengagement. It is preferred to hydrofinish the product resulting from dewaxing in order to adjust product qualities to desired specifications. Hydrofinishing is a form of mild hydrotreating directed to saturating any lube range olefins and residual aromatics as well as to removing any remaining heteroatoms and color bodies. The post dewaxing hydrofinishing is usually carried out in cascade with the dewaxing step. Generally the hydrofinishing will be carried out at temperatures from about 150° C. to 350° C., preferably 180oC to 250° C. Total pressures are typically from 2859 to 20786 kPa (about 400 to 3000 psig). Liquid hourly space velocity is typically from 0.1 to 5 LHSV (hr$^{-1}$), preferably 0.5 to 3 hr$^{-1}$ and hydrogen treat gas rates of from 44.5 to 1780 m$^3$/m$^3$ (250 to 10,000 scf/B).

Hydrofinishing catalysts are those containing Group 6 metals (based on the IUPAC Periodic Table format having Groups from 1 to 18), Groups 8-10 metals, and mixtures thereof. Preferred metals include at least one noble metal having a strong hydrogenation function, especially platinum, palladium and mixtures thereof. The mixture of metals may also be present as bulk metal catalysts wherein the amount of metal is 30 wt. % or greater based on catalyst. Suitable metal oxide supports include low acidic oxides such as silica, alumina, silica-aluminas or titania, preferably alumina. The preferred hydrofinishing catalysts for aromatics saturation will comprise at least one metal having relatively strong hydrogenation function on a porous support. Typical support materials include amorphous or crystalline oxide materials such as alumina, silica, and silica-alumina. The metal content of the catalyst is often as high as about 20 weight percent for non-noble metals. Noble metals are usually present in amounts no greater than about 1 wt. %. A preferred hydrofinishing catalyst is a mesoporous material belonging to the M41S class or family of catalysts. The M41 family of catalysts are mesoporous materials having high silica contents whose preparation is further described in J. Amer. Chem. Soc., 1992, 114, 10834. Examples included MCM-41, MCM-48 and MCM-50. Mesoporous refers to catalysts having pore sizes from 15 to 100 Å. A preferred member of this class is MCM-41 whose preparation is described in U.S. Pat. No. 5,098,684. MCM-41 is an inorganic, porous, non-layered phase having a hexagonal arrangement of uniformly-sized pores. The physical structure of MCM-41 is like a bundle of straws wherein the opening of the straws (the cell diameter of the pores) ranges from 15 to 100 Angstroms. MCM-48 has a cubic symmetry and is described for example is U.S. Pat. No. 5,198,203 whereas MCM-50 has a lamellar structure. MCM-41 can be made with different size pore openings in the mesoporous range. The mesoporous materials may bear a metal hydrogenation component, which is at least one of Group 8, Group 9 or Group 10 metals. Preferred are noble metals, especially Group 10 noble metals, most preferably Pt, Pd or mixtures thereof.

Generally the hydrofinishing will be carried out at temperatures from about 150° C. to 350° C., preferably 180° C. to 250° C. Total pressures are typically from 2859 to 20786 kPa (about 400 to 3000 psig). Liquid hourly space velocity is typically from 0.1 to 5 LHSV ($hr^{-1}$), preferably 0.5 to 3 $hr^{-1}$ and hydrogen treat gas rates of from 44.5 to 1780 $m^3/m^3$ (250 to 10,000 scf/B).

Catalyst Preparation and Process Description

Since normal hydrocarbon feedstocks derived from petroleum contain amounts of sulfur and nitrogen that are detrimental to dewaxing catalysts, it is preferred that such feedstocks are hydrotreated prior to dewaxing. Thus the feedstocks to the present catalytic dewaxing process that contain unacceptable levels of sulfur and nitrogen contaminants are preferably hydroprocessed and subsequently stripped to remove gaseous sulfur- and nitrogen-containing contaminants such as hydrogen sulfide and ammonia. The hydrotreated feedstocks are then sent to the dewaxing step.

The catalysts used in the catalytic dewaxing step are usually purchased from a catalyst manufacturer. The user has the option of metal-loading the catalyst or purchasing the catalyst in the metal-loaded form. As noted previously, metal loading can be accomplished by impregnating the dewaxing catalyst with a decomposable metal salt such as an amine salt, e.g., platinum tetramine complex followed by heating. Sulfiding can be accomplished by treating the metal loaded catalyst with a sulfiding mixture such as hydrogen/hydrogen sulfide or other sulfiding agent, or by contacting the catalyst with hydrogen and a feedstock spiked with a sulfiding agent or by using a feedstock containing organo sulfur compounds.

In order to selectively activate (selectivate) the dewaxing catalyst, the oxygenate or mixture of oxygenates may be added directly to the hydrocarbon feed to be dewaxed. Alternatively, the dewaxing catalyst can be selectively activated separately and the activated catalyst used in the dewaxing process. In the former process, a hydrocarbon feed containing at least about 100 wppm, measured as oxygen, of at least one oxygenate is contacted with the dewaxing catalyst under dewaxing conditions. The time effective to selectivate that catalyst is at least one hour, preferably at least 24 hours. The catalyst selectivation may also be followed by monitoring the yield of isomerate from dewaxing. Alternatively, the dewaxing catalyst can be selectively activated prior to use in the dewaxing process. In this case, the dewaxing catalyst is heated at a temperature of from 120 to 400° C. and a hydrogen pressure of from 101 to 20786 kPa (0 to 3000 psig) in the presence of a feed containing at least about 100 wppm, measured as oxygen, of at least one oxygenate. The time effective to selectivate the catalyst is at least one hour, preferably at least 24 hours. The catalyst selectivation may also be monitored by testing catalyst samples for increased isomerate yield in the dewaxing process. The feed may be the same or different from the hydrocarbon feed to be dewaxed. Thus the feed may either be a carrier feed or the hydrocarbon feed to be dewaxed. If the feed is a carrier feed, it is preferred that the carrier be a hydrocarbon such as product resulting from the present catalytic dewaxing process. As noted previously, the dewaxing catalyst may be used in the sulfided or unsulfided form and may be reduced.

Catalyst preparation and subsequent dewaxing can be accomplished in a single reactor or in separate reactors. In a preferred embodiment, a noble metal loaded ZSM-48 dewaxing catalyst is placed in a reactor and hydrogen and a carrier feedstock containing sulfiding agent added to the reactor. It is preferred that the carrier feedstock be similar to a basestock cut expected as a final product, e.g., a 100N oil. The catalyst is reduced, sulfided or both reduced and sulfided. The reduced and/or sulfided catalyst can then be selectively activated by contacting with a carrier containing at least one oxygenate. The carrier can be either the feedstock to be dewaxed or some other hydrocarbon feedstock such as the carrier used to sulfide the catalyst.

Once the catalyst has been selectively activated with oxygenate(s), the feedstock to be dewaxed is added to the reactor and dewaxing takes place under conditions defined above. Further oxygenate treatment may be added as needed to maintain catalyst activity.

The product from catalytic dewaxing may be sent to hydrofinishing in a separate reactor without any intervening disengagement. Direct cascade from dewaxer to hydrofinisher is preferred thus avoiding the expense involved in an additional stripping step. Hydrofinishing is done in the presence of hydrogen and a hydrofinishing catalyst. The hydrofinishing reaction conditions are noted hereinbefore. Hydrofinishing is useful to remove color bodies, enhance stability and improve toxicological properties.

The hydrofinished product is then fractionated to isolate desired lubricant products. The individual cuts of lubricants products are attractive as basestocks for meeting Group II and Group III requirements. These Group classifications are those used by the American Petroleum Institute (API). API Group II basestocks have a saturates content of 90 wt. % or greater, a sulfur content of not more than 0.03 wt. % and a VI greater than 80 but less than 120. API Group III basestocks have the same requirements as Group II basestocks except that the VI is greater than 120.

The base stocks produced the present process have a unique combination of properties. The basestocks have VI from 145 to 155, a viscosity at 100° C. of from 3.0 to 4.3 cSt, preferably 3.0 to 3.6 and a pour point of from −15 to −40° C. The combination of very high VI at very low viscosity and pour point in indicative of the outstanding qualities of the base stocks.

Referring now to FIG. 1, a waxy feedstock such as a slack wax is fed through line 10 to hydrotreating unit 14. Hydrogen is added to hydrotreating unit 14 through line 12. Hydrotreater 14 is loaded with a bed of hydrotreating catalyst 16. Hydrotreated feedstock is conducted through line 18 to stripper 20 and light gases are removed through line 22. Liquid product is then sent from striper 20 through line 24 to hydrodewaxing unit 28. Additional hydrogen is added through line 26. Hydrodewaxing unit 28 is loaded with a bed of hydrodewaxing catalyst 30 which catalyst has been selectively activated by oxygenate treatment. Hydrodewaxed product is then sent through line 32 to hydrofinishing unit 34 which is loaded with a bed of hydrofinishing catalyst 36. Hydrofinished product is then sent through line 38 to vacuum stripper 40. Light products are removed through line 42 and remaining liquid product sent through line 44 to a vacuum distillation unit (not shown).

The invention is further illustrated by the following examples that are not intended as limiting.

EXAMPLES

Example 1

This example illustrates that processing clean feeds with a reduced sulfided and oxygenate treated hydrodewaxing catalyst can produce a high quality dewaxed oil at excellent yield. The feed is a 600N slack wax (SW) hydrotreated at 340° C. whose properties are given in Table 1. Viscosity was measured using standard ASTM tests (D445-94 and D2270-91) using a Houillon Automated Viscometer with a repeatability of 0.5%. Pour points are determined by standard ASTM test (D 97). Sulfur and nitrogen contents may be measured by standard ASTM methods D5453 and D4629, respectively. The error limits for yield and pour points are ±1 and ±3, respectively.

TABLE 1

| Viscosity, cSt at 100° C. | 8.03 |
|---|---|
| Nitrogen, Wppm | 43 |
| Sulfur, Wppm | 1230 |
| Oil in wax, wt % | 23.8 |

The feed from Table 1 was hydrotreated with Akzo Nobel KF848 catalyst under the following hydrotreating conditions: 340° C., LHSV of 0.7 v/v/h, 1000 psig (6996 kPa), treat rate of 1500 scf/B H$_2$ (267 m$^3$/m$^3$). The hydrotreated product's 370° C.+ yield was 94.1 wt. % on feed. The hydrotreated product's properties are given in Table 2.

TABLE 2

| Viscosity, cSt at 100° C. | 6.702 |
|---|---|
| Nitrogen, Wppm | 0.48 |
| Sulfur, Wppm | 1.5 |

The hydrotreated product was hydrodewaxed (HDW) in a reactor with a catalyst comprising ZSM-48 catalyst bound with 35 wt % gamma alumina and loaded with 0.6 wt. % Pt. The catalyst was then dried at 120° C., reduced in hydrogen, and sulfided at temperatures up to 320° C. with 400 wppm hydrogen sulfide in nitrogen to breakthrough. This catalyst was then subjected to an in-situ oxygenate selectivation procedure using a Fischer Tropsch wax containing 600 wppm oxygenates as measured by neutron activation. The selectivation and hydrodewaxing conditions were as follows: 1 v/v/h, 1000 psig (6996 kPa), 2500 scf/B H$_2$ (445 m$^3$/m$^3$). The hydrodewaxed results are given in Table 3.

TABLE 3

| Average Reactor Temp. ° C. | 320 | 325 | 330 |
|---|---|---|---|
| 370° C.+ Yield, wt. % on feed to HDW | 83.8 | 78.6 | 69.6 |
| Product Properties | | | |
| Viscosity at 100° C. (cSt) | 6.883 | 6.661 | 6.514 |
| VI | 154 | 150 | 144 |
| Pour Point (° C.) | −7 | −17 | −33 |

Example 2

This example illustrates that processing clean feeds with a reduced sulfided and oxygenate treated hydrodewaxing catalyst can produce a high quality dewaxed oil at excellent yield. The feed is a 150 N slack wax whose properties are given in Table 4. The feed was hydrotreated at 345° C.

TABLE 4

| Viscosity, cSt at 100° C. | 3.6 |
|---|---|
| Nitrogen, Wppm | 0.4 |
| Sulfur, Wppm | 120 |
| Oil in wax, wt. % | 7.0 |

The feed from Table 4 was hydrotreated with Akzo Nobel KF848 catalyst under the following hydrotreating conditions: 345° C., 0.7 v/v/h, 1000 psig (6996 kPa), 1500 scf/B H$_2$ (267 m$^3$/m$^3$). The hydrotreated product's 370° C.+ yield was 93.2 wt. % on feed. The hydrotreated product's properties are given in Table 5.

TABLE 5

| Viscosity, cSt at 100° C. | 3.4 |
|---|---|
| Nitrogen, Wppm | 0.1 |
| Sulfur, Wppm | 0 |

The hydrotreated product was hydrodewaxed with a catalyst comprising ZSM-48 catalyst bound with 35 wt % gamma alumina and loaded with 0.6 wt. % Pt. The catalyst was then dried at 120° C., reduced in hydrogen, and sulfided at temperatures up to 320° C. with 400 wppm hydrogen sulfide in nitrogen to breakthrough. This catalyst was then subjected to an in-situ selectivation procedure using a Fischer Tropsch wax containing 600 wppm oxygenates as measured by neutron activation. The selectivation and hydrodewaxing conditions were as follows: 1 v/v/h, 1000 psig (6996 kPa), 2500 scf/B H$_2$ (445 m$^3$/m$^3$). The hydrodewaxed results are given in Table 6.

TABLE 6

| Average Reactor Temp. ° C. | 330 | 335 |
|---|---|---|
| 370° C.+ Yield, wt. % on feed to HDW | 81.8 | 67.2 |
| 370° C.+ Product Properties | | |
| Viscosity at 100° C. (cSt) | 3.495 | 3.428 |
| VI | 158 | 148 |
| Pour Point (° C.) | −5 | −29 |

The product produced at a reactor temperature of 335° C. is unique in that its combination of VI, viscosity and pour point demonstrate a very high quality product. As shown by the data, the base stock has a very high VI (148), a very low viscosity (3.428) at a low pour point (−29). A product having such a high VI at the very low viscosity and pour point is indicative of the unusual combination of properties of this base stock.

Example 3

This example compares the performance of a reduced and sulfided catalyst with that of a reduced, sulfided catalyst that has been additionally oxygenate selectivated in-situ with a Fischer Tropsch feedstream containing 600 ppm of oxygenates. The feed is a 150N slack wax (SW) which has been hydrotreated with Akzo Nobel KF848 catalyst under the following hydrotreating conditions: 345° C., 0.7 v/v/h, 1000 psig (6996 kPa), 1500 scf/B $H_2$ (267 $m^3/m^3$). The hydrotreated product's 370° C.+ yield was 93.2 wt. % on feed. The hydrotreated product's properties are given in Table 7.

TABLE 7

Feed: 150N SW (7.0% Oil In Wax (OIW))

| Catalyst Treatment | A<br>Reduced +<br>Sulfided<br>only | B<br>Reduced +<br>Sulfided +<br>oxygenate<br>Condition A | C<br>Reduced +<br>Sulfided +<br>oxygenate<br>Condition B |
|---|---|---|---|
| Average Reactor Temperature, ° C. | 329 | 340 | 345 |
| 370° C.+ Lube Properties | | | |
| 370° C.+ Lube yield, wt. % on feed to Hydrodewaxer | 52.6 | 68.4 | 53.0 |
| Viscosity, cSt at 100° C. | 3.3 | 3.404 | 3.373 |
| VI | 134 | 148 | 139 |
| 370° C.+ Pour Point ° C. | −26 | −27 | −37 |

Table 5 shows that the catalyst selectivated by reduction, sulfiding and oxygenate treatment with has superior low temperature properties and VI at constant yield over the catalyst treated only by reduction and sulfiding (column A vs. column C). Alternatively at constant pour point (column A vs. colum B) the catalyst selectivated with oxygenates gives a yield credit of 15.8 wt. % on feed. Moreover, the product shown in column B is unique in that its combination of VI, viscosity and pour point demonstrate a very high quality product. As shown by the data, the base stock has a very high VI (148), a very low viscosity (3.404) at a low pour point (−27).

Wax isomerate selectivity is defined as:

$$\text{Selectivity} = \frac{370°\text{C.} + \text{yield}(\%) - \text{Feed oil content}(\%)}{\text{Feed Wax content}(\%)}$$

Selectivity Improvement is defined as:

$$\text{Selectivity Improvement} = \frac{\text{Selectivated Catalyst Selectivity}}{\text{Base Catalyst Selectivity}}$$

Calculation example for Example 3:

Selectivity Improvement =

$$\frac{(68.4 - 7.0)/93.0}{(52.6 - 7.0)/93.0} = \frac{0.66}{0.49} = 1.34 \text{ or } 34\% \text{ over base case}$$

Example 4

This example presents a comparison of reduced, sulfided catalyst with reduced, sulfided plus oxygenate treatment catalyst for a 600N SW (16.5% OIW) feedstock. The feed properties are listed in table 8

TABLE 8

| Viscosity, cSt at 100° C. | 7.95 |
|---|---|
| Nitrogen, Wppm | 14 |
| Sulfur, Wppm | 912 |
| Oil in wax, Wt. % | 16.5 |

This example compares the performance of a reduced and sulfided catalyst with that of a reduced, sulfided catalyst that has been additionally selectivated with a Fischer Tropsch feedstream containing 600 ppm of oxygenates. The feed is a 600N slack wax (SW) which has been hydrotreated with Akzo Nobel KF848 catalyst under the following hydrotreating conditions: 345° C., 0.7 v/v/h, 1000 psig (6996 kPa), 1500 scf/B $H_2$(267 $m^3/m^3$). The hydrotreated product's 370° C.+ yield was 93.2 wt. % on feed. The hydrotreated product's properties are given in Table 9.

TABLE 9

| Viscosity, cSt at 100° C. | 7.2 |
|---|---|
| Nitrogen, Wppm | 5 |
| Sulfur, Wppm | 1 |

TABLE 10

Feed: 600N SW(16.5% OIW)

| | A | B |
|---|---|---|
| Catalyst Treatment | Reduced + Sulfided | Reduced + Sulfided + oxygenate |
| Average Reactor Temperature, ° C. | 329 | 335 |
| 370° C.+ Lube Properties | 60.4 | 76.8 |
| Viscosity, cSt at 100° C. | 6.8 | 6.8 |
| VI | 142 | 151 |
| 370° C.+ Pour Point ° C. | −22 | −20 |

Table 10 shows that the catalyst selectivated by reduction, sulfiding and oxygenate at constant pour point in comparison to the catalyst selectivated with oxygenates (column A vs. column B), gives a yield credit of 16.4 wt. % on feed and a VI credit of 9 points.

Example 5

This example demonstrates the impact of higher temperature operation on selectivity on a selectivated catalyst. This example also demonstrates that selectivation is reversible after a higher temperature operation as well as the possibility to re-selectivated in-situ.

The ex-situ sulfided catalyst (Cat-C) was loaded and dried according to the procedure described in Example 1.

Figure 2:
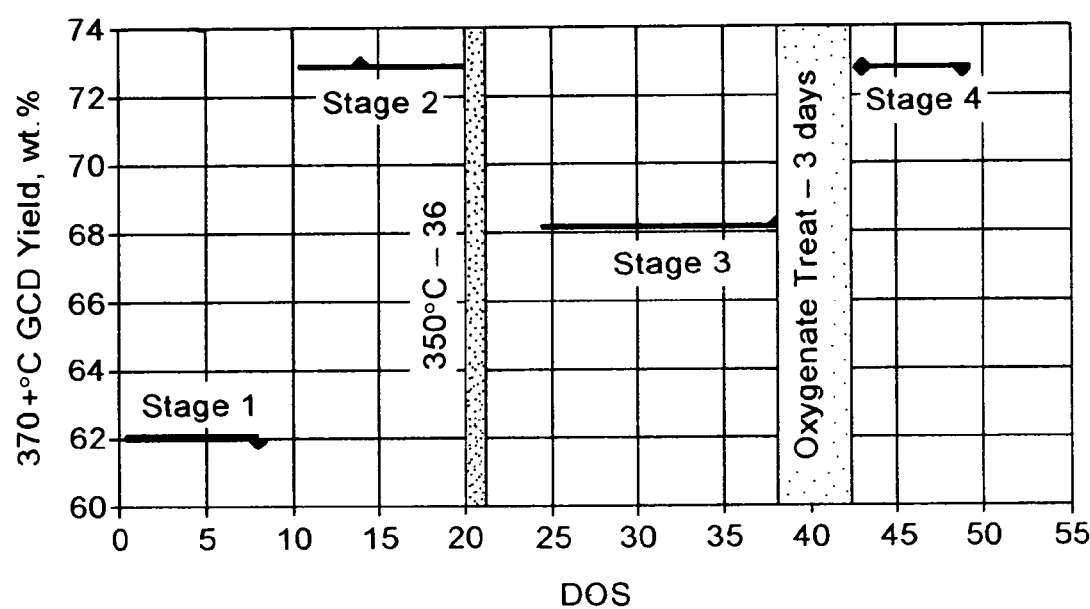
FIG. 2 is a graph showing the effect of temperature on selectivity for a selectivated catalyst.

As shown in FIG. 2:

Stage 1, the catalyst was lined-out with an oxygenate free hydrotreated 150N slack wax.

Stage 2, the catalyst was then treated with the oxidized hydrotreated 150N slack wax feedstock described in example 1 containing between 1000 and 3000 ppm oxygen (as oxygenate).

After Stage 2, the unit was washed using a medicinal grade white oil to remove all traces of polars and aromatics. The catalyst temperature was then increased to 350° C. under white oil at 1000 psig pressure and maintained at 350° C. for 36 hours. After the 36 hours hold, the temperature was reduced to the operating temperature of 328° C., this operation was also conducted under white oil.

Stage 3, after the higher temperature treatment, was run for 10 days using the same oxygenate free hydrotreated 150N slack wax used in stage 1.

At the end of stage 3, the catalyst was exposed to the oxidized hydrotreated 150N slack wax feedstock described in example 1 containing between 1000 and 3000 ppm oxygenate, at 328° C. for 3 days.

Stage 4, after the higher temperature treatment, was run for 10 days using the same oxygenate free hydrotreated 150N slack wax used in stage 1.

TABLE 11

| Treatment | Stage 1 | Stage 2 | Stage 3 | Stage 4 |
|---|---|---|---|---|
| | Ex-situ sulfided | Stage 1 after [O] treat | Stage 2 after High Temp. | Stage 3 after [O] treat |
| Days on Oil | 8 | 14 | 38 | 49 |
| Temperature (° C.) | 329 | 325 | 328 | 328 |
| 370+° C. Yield (wt. %) | 61.9 | 73.0 | 67.7 | 72.7 |
| Selectivity Improvement (%) | Base | +19 | +10 | +19 |
| 370+° C. Isomerate K. Viscosity @ 40° C. (cSt) | 12.785 | 13.798 | 13.695 | 12.814 |
| 370+° C. Isomerate K. Viscosity @ 100° C. (cSt) | 3.371 | 3.571 | 3.515 | 3.393 |
| 370+° C. Isomerate Viscosity Index | 143 | 147 | 141 | 145 |
| 370+° C. Isomerate Pour Point (° C.) | −19 | −19 | −23 | −19 |

Data in Table 11 and FIG. 2 demonstrate:

a partial loss of the yield credit after higher temperature treatment (Stage 3 versus Stage 2)

that ZSM-48 can be "re-selectivated" in-situ after processing an oxygenated containing feedstock. (Stage 4 versus Stage 3)

The invention claimed is:

1. A lubricating oil base stock made by a process which comprises:
   (a) hydrotrlating a lubricating oil feedstock having a wax content of at least about 50 wt. %, based on feedstock, with a hydrotrcating catalyst under effective hydrotreating conditions;
   (b) stripping the hydrotreated feedstock to separate gaseous from liquid product;
   (c) contacting a dewaxing catalyst with a stream containing from about 100 wppm to 10,000 wppm, measured as oxygen, of at least one oxygenate at a temperature of from 120 to 400° C. and a hydrogen pressure of from 791 to 20786 kPa to produce a selectivated dewaxing catalyst; and
   (d) contacting the selectivate dewaxing catalyst from step (c) with the liquid product from step (b) and dewaxing the liquid product under catalytically effective dewaxing conditions; said base stock having a VI from 145 to 155 measured using ASTM test D2270, a viscosity at 100° C. of from 3.0 to 4.3 cSt and a pour point of from −15 to −40° C.

2. A lubricating oil base stock made by a process which comprises:
   (a) hydrotrlating a lubricating oil feedstock having a wax content of at least about 50 wt. %, based on feedstock, with a hydrotreating catalyst under effective hydrotreating conditions;
   (b) stripping the hydrotreated feedstock to separate gaseous from liquid product;
   (c) adding at least one oxygenate to the liquid product from step (b) to provide a second liquid product containing from about 100 wppm to 10,000 wppm oxygen,
   (d) contacting the second liquid product from step (c) with a dewaxing catalyst at a temperature of from 120 to 400° C. and a hydrogen pressure of from 791 to 20786 kPa for a time effective to selectivate the dewaxing catalyst; and
   (e) contacting the selectivated dewaxing catalyst from step (d) with at least one of the second liquid product from step (c) or the liquid product from step (b) under catalytically effective dewaxing conditions; said base stock having a VI from 145 to 155 measured using ASTM test D2270 and a viscosity of from 3.0 to 3.6.

3. The base stock of claim 1 having a viscosity of from 3.0 to 3.6.

* * * * *